2,769,729
Patented Nov. 6, 1956

2,769,729
PROCESS FOR FIREPROOFING POROUS MATERIALS

Lodewijk J. C. Van de Zande, Schoten-Antwerp, Belgium

No Drawing. Application December 3, 1954,
Serial No. 473,026

Claims priority, application Belgium December 5, 1953

2 Claims. (Cl. 117—137)

This invention relates to a fireproofing process for fabrics, paper and generally porous materials.

Said process has been provided to insure simply and economically a complete incombustibility of the materials treated thereby.

For this purpose, the materials to be fireproofed are treated with a solution including one or more of the following ingredients: ammonium sulphate, ammonium phosphate, boric acid and sodium tetraborate.

According to an advantageous embodiment of said process, use is made of a solution comprising ammonium sulphate, ammonium phosphate, boric acid and sodium tetraborate.

According to a preferred embodiment, use is made of such a solution that comprises, for 1 liter of water, about 10 to 50 grams of ammonium sulphate, 10 to 50 grams of ammonium phosphate, 1 to 15 grams of boric acid and 1 to 15 grams of sodium tetraborate.

Other advantages and features of the invention will be evident from the following description of a fireproofing process for fabrics, paper and generally porous materials.

According to the process provided by the invention, use is made of a solution which comprises, for 1 liter of water, 10 to 50 grams of ammonium sulphate, 10 to 50 grams of ammonium phosphate, 1 to 15 grams of boric acid and 1 to 15 grams of sodium tetraborate. Said solution is preferably used at a temperature of 30° to 35° C.

To fireproof fabrics and paper, said materials are left to soak in the solution for about a quarter of an hour. The solution may, however, also be applied on the materials by means of a spray-gun or of an apparatus enabling the impregnation. After impregnating the materials in such a way, they are dried in the open air or in a suitable oven. After said treatment, the materials are completely fireproof.

If it is desired not only to fireproof said materials but also to make them free of bacteria, about 1% of formalin is added to the solution. The materials treated in such a way become fungicidal and insecticidal and then have a disinfectant power.

So as to make a steady mixing of the solution unnecessary and to increase its penetration power, and also to prevent the formation of dust after drying, 1 to 5% Turkey red oil and 1 to 5% glycerin are added.

If, due to the properties of the porous material to be treated, the penetration power of the solution must be increased, the temperature thereof is raised to 50° C. It is, however, advisable not to exceed said temperature limit.

The details of the embodiment may be varied without departing from the invention, in the field of the equivalences, notably relatively to the solution composition.

I claim:

1. A process for fireproofing fabrics, paper, and porous material in general, which comprises impregnating the material to be fireproofed with a solution of ammonium sulfate, ammonium phosphate, boric acid, sodium tetraborate, 1 to 5% by weight of glycerine, and 1 to 5% by weight of Turkey red oil.

2. A process for fireproofing fabrics, paper, and porous material in general, which consists essentially in impregnating the material to be fireproofed with an aqueous solution of, per liter of water, about 10 to 50 grams of ammonium sulphate, 10 to 50 grams of ammonium phosphate, 1 to 15 grams of boric acid, and 1 to 15 grams of sodium tetraborate, said solution also containing 1 to 5% by weight of glycerine and 1 to 5% by weight of Turkey red oil.

References Cited in the file of this patent

UNITED STATES PATENTS

| Re. 12,084 | Blackmore | Feb. 24, 1903 |
|---|---|---|
| 1,030,909 | Mesturino | July 2, 1912 |
| 1,926,253 | Allen | Sept. 12, 1933 |
| 2,606,131 | Aiken et al. | Aug. 5, 1952 |